(12) United States Patent
Jenkins et al.

(10) Patent No.: US 10,136,614 B2
(45) Date of Patent: Nov. 27, 2018

(54) CUSHIONING DEVICE FOR LARGE ANIMALS

(71) Applicant: Promat Inc., Woodstock (CA)

(72) Inventors: Andrew W. Jenkins, London (CA); Beat Riedener, Kitchener (CA); Jack Bernard Bosman, Kitchener (CA); Jason Stevens, Elmira (CA); Robert Jan Nugteren, Bloomingdale (CA)

(73) Assignee: CGW CANADA INC., Drayton (CA)

(*) Notice: Subject to any disclaimer, the term of this patent is extended or adjusted under 35 U.S.C. 154(b) by 382 days.

(21) Appl. No.: 14/784,740

(22) PCT Filed: Apr. 15, 2014

(86) PCT No.: PCT/CA2014/050377
§ 371 (c)(1),
(2) Date: Oct. 15, 2015

(87) PCT Pub. No.: WO2014/169386
PCT Pub. Date: Oct. 23, 2014

(65) Prior Publication Data
US 2016/0057971 A1    Mar. 3, 2016

Related U.S. Application Data

(60) Provisional application No. 61/812,012, filed on Apr. 15, 2013.

(51) Int. Cl.
*A01K 1/015*    (2006.01)
*A01K 1/035*    (2006.01)
*A47C 27/08*    (2006.01)

(52) U.S. Cl.
CPC .......... *A01K 1/0353* (2013.01); *A01K 1/0157* (2013.01); *A47C 27/08* (2013.01); *A47C 27/085* (2013.01)

(58) Field of Classification Search
CPC .... A01K 1/0157; A01K 1/015; A01K 1/0353; A01K 1/035; A47C 27/08; A47C 27/085
See application file for complete search history.

(56) References Cited

U.S. PATENT DOCUMENTS 3,775,782 A * 12/1973 Rice .......................... A61G 1/00
                                                                               128/DIG. 20
4,930,174 A * 6/1990 Hunter .................. A47C 27/081
                                                                                417/479

(Continued)

FOREIGN PATENT DOCUMENTS

WO        2011054091 A1    5/2011

*Primary Examiner* — Joshua D Huson
(74) *Attorney, Agent, or Firm* — Eduardo Krupnik

(57) ABSTRACT

The present invention relates to a cushion device for supporting a large animal such as a cow, a horse, a buffalo, a sheep, a goat, a pig and so forth. The cushioning device includes a top and bottom surface interconnected by a 'drop stitch' structure and a chamber. Contained within the chamber of the cushioning device is a filling material. The filling material includes a gaseous compound, a liquid or a mixture of a gaseous compound and a liquid. Additionally, the present invention also relates to the methods of transporting and installing the cushioning device. The device is shipped to the installation site absent the filling material. During installation a controlled mixture of dual phase fluids such as water and inert gas are disposed into the cushioning device, creating a gelatinous and gaseous filling material.

12 Claims, 14 Drawing Sheets

(56) References Cited

U.S. PATENT DOCUMENTS

| | | | | |
|---|---|---|---|---|
| 4,942,634 A | * | 7/1990 | Saloff | A47C 27/085 |
| | | | | 5/654 |
| 5,144,708 A | * | 9/1992 | Pekar | F16K 15/202 |
| | | | | 137/223 |
| 5,653,195 A | | 8/1997 | Young | |
| 6,826,795 B2 | | 12/2004 | Wilkinson | |
| 7,669,552 B2 | * | 3/2010 | Arvanites | A01K 1/0353 |
| | | | | 119/28.5 |
| 7,861,662 B2 | | 1/2011 | Rista | |
| 2004/0049856 A1 | * | 3/2004 | Chae | A47C 27/081 |
| | | | | 5/711 |
| 2010/0077962 A1 | * | 4/2010 | Arvanites | A01K 1/0353 |
| | | | | 119/28.5 |
| 2012/0266822 A1 | * | 10/2012 | Stevens | A01K 1/0157 |
| | | | | 119/28.5 |

* cited by examiner

CUSHIONING DEVICE FOR LARGE ANIMALS

CROSS REFERENCE TO RELATED APPLICATIONS

This application is a national stage application under 35 U.S.C. § 371 of International Application No. PCT/CA2014/050377, filed Apr. 15, 2014, which in turn claims the benefit under 35 U.S.C. § 119(e) of U.S. Provisional Ser. No. 61/812,012, filed Apr. 15, 2013, the contents of each of which are hereby incorporated by reference into the present disclosure.

FIELD OF INVENTION

The present invention relates to cushioning devices, specifically the present invention relates to a drop stitch fabric to form a mattress for providing comfort to large animals. The present invention relates also to the transportation, installation and automatic control of the cushioning device at a desired pressure.

BACKGROUND OF INVENTION

Prior animal cushioning devices comprised of either a plurality of combined fabric chamber packed with comminuted rubber for example, U.S. Pat. No. 5,653,195 or utilizing a gelatinous material again housed within a plurality of chambers forming a mattress (WO2011/054091). While such mattresses do provide cushioning, the uneven surface generated by plurality of chambers fosters hygiene issues amongst the livestock as these mattresses can be challenging to clean. Furthermore, the resiliency of the cushioning with the age of the mattress does begin to taper off, thus limiting the longevity of the mattress.

Another form of prior art is the inflatable kayak type boat U.S. Pat. No. 7,861,662 which utilizes the drop stitch structure to form a single floatation chamber. However the kayak of this prior art is solely pressurized with air, and not designed to resist the weight and forces imparted by large animals, as this term is defined below.

Another form of prior art is the inflatable cushioning device with manifold system U.S. Pat. No. 6,826,795 which uses a manifold system for providing separately adjustable pressure zones within a single cushioning device for human patients. Nevertheless, this prior art is designed for use with a single human patient and not designed to withstand the weight and forces imparted by large animals.

What is needed is a cushioning device that is capable of absorbing and withstanding the dynamic and static forces imposed by large animals, all the while maintaining or exceeding the level of comfort posed by existing products. What is also needed is a cushioning device that maintains resiliency with age, thus increasing the longevity of the device. What is also needed is to utilize a manifold system to enable customizing the firmness and softness of a plurality of cushioning devices for one animal up to several animals.

SUMMARY OF THE INVENTION

One object of the present invention is to provide a cushioning device designed from a flat chamber, which may be a single flat chamber, capable of withstanding the forces imposed by large animals.

In one embodiment, the invention relates to a cushioning device. The cushioning device, in one embodiment, includes a drop stitch structure and a chamber configured for receiving an amount of a filling material.

In one embodiment of the present invention, the cushioning device further includes: (a) a top wall and (b) a bottom wall, the top and bottom surfaces being connected by the drop stitch structure.

In another embodiment of the cushioning device of the present invention, the filling material includes a gaseous compound.

In another embodiment of the cushioning device of the present invention, the filling material is a mixture of a gaseous compound and a liquid.

In another embodiment of the cushioning device of the present invention, the liquid is a gelatinous material based on a super absorbent polymer.

In another embodiment of the cushioning device of the present invention, the mixture comprises about 1-20% v/v % gaseous compound and about 80-99% v/v % gelatinous material.

In another embodiment of the cushioning device of the present invention, the gaseous compound includes air, nitrogen, argon, or a combination thereof.

In another embodiment of the cushioning device of the present invention, the amount of filling material within the chamber is sufficient to exert a positive pressure upon the chamber sufficiently beyond atmospheric pressure when there is no large animal on said cushioning device.

In another embodiment of the cushioning device of the present invention, the pressure within the chamber ranges between about 0.1 PSI to about 12 PSI.

In another embodiment of the cushioning device of the present invention, the pressure within the chamber ranges between about 2.1 PSI to about 14 PSI.

In another embodiment of the cushioning device of the present invention, the cushioning device includes at least one valve having means of fluid communication with a site exterior to the chamber.

In another embodiment of the cushioning device of the present invention, the means for communication with the site exterior to the chamber includes a check valve or a valve having a septum disposed within.

In another embodiment of the cushioning device of the present invention, the cushioning device further includes at least one port connecting the chamber with an exterior of the cushioning device, and a cap for sealing the at least one port, the cap comprising (i) a main body, (ii) a connector extending from the main body, the connector designed for interfacing with the port of the cushioning device, and (iii) a septum disposed in the cap, the septum configured for receiving an inflation needle there through and into the chamber of the cushioning device.

In another embodiment of the cushioning device of the present invention, the drop-stitch structure comprises two opposing base layers connected by a plurality of threads, and wherein the two opposing layers directly line the chamber of the cushioning device.

In another embodiment of the cushioning device of the present invention, the top and bottom walls include a fabric layer having a scrim.

In another embodiment of the cushioning device of the present invention, the cushioning device further includes an abrasion resistant material adjacent to either or both the top and bottom walls.

In another embodiment of the cushioning device of the present invention, the cushioning device is in communication with a filling material reservoir.

In another embodiment of the cushioning device of the present invention, the cushioning device further includes a filling material reservoir, an intake valve and an exhaust valve, at least the intake vale being in communication with the filling material reservoir, the intake valve having an intake check valve configured for allowing filling material to flow into the cushioning device, while preventing the filling material from flowing out of the cushioning device, and the exhaust valve having an exhaust check valve configured for allowing filling material to flow out of the cushioning device, while preventing filling material from flowing back into the cushioning device.

In another embodiment of the cushioning device of the present invention, the cushioning device is a large animal cushioning device.

In another embodiment of the cushioning device of the present invention, the large animal includes a cow, a horse, a buffalo a goat and a pig.

In another embodiment of the cushioning device of the present invention, the cushioning device when filled with the filling material is capable of withstanding an animal weighing more than about 400 Kg.

In another embodiment of the cushioning device of the present invention, the cushioning device when filled with the filling material is capable of withstanding an animal weighing between about 400 Kg and about 1,200 Kg.

In one embodiment, the present invention provides a system including (a) at least one cushioning device according to any of the previous embodiments, and (b) a filling material reservoir in connection with the at least one cushioning device.

In one embodiment of the system of the present invention, each of the at least one cushioning device includes at least one intake valve, at least one exhaust valve, at least the intake vale being in communication with the filling material reservoir, the at least one intake valve having an intake check valve configured for allowing filling material to flow into the cushioning device, while preventing the filling material from flowing out of the cushioning device, and the at least one exhaust valve having an exhaust check valve configured for allowing filling material to flow out of the cushioning device, while preventing filling material from flowing back into the cushioning device.

In another embodiment of the system of the present invention, the system is maintained at a desired pressure.

In another embodiment of the system of the present invention, the cushioning device is a large animal cushioning device.

In another embodiment of the system of the present invention, the large animal includes a cow, a horse, a buffalo a goat and a pig.

In another embodiment of the system of the present invention, the cushioning device when filled with the filling material is capable of withstanding an animal weighing more than about 400 Kg.

In yet another embodiment of the system of the present invention, the cushioning device when filled with the filling material is capable of withstanding an animal weighing between about 400 Kg and about 1,200 Kg.

In one embodiment, the present invention provides for a method of installing cushioning device at a site. In one embodiment, the installation method includes: (a) providing a cushioning device having a drop stitch structure and a chamber configured for receiving a filling material, (b) delivering the cushioning device and an amount of a polymer capable of producing gel upon contact with a liquid to the site, and (c) mixing the polymer with a controlled mixture of the liquid to create the gel inside the chamber of the cushioning device.

In one embodiment of the method, the cushioning device is delivered with the amount of polymer inside the chamber or outside the chamber.

In another embodiment of the method, the method further comprises introducing a gas into the chamber.

In one embodiment, the present invention provides for a kit comprising (a) a cushioning device of any of the above embodiments and (b) a filling material.

In one embodiment of the kit, the filling material is provided inside the chamber.

In another embodiment of the kit, the filling material is provided outside the chamber.

In yet another embodiment of the kit, the kit further comprises an installation manual.

In one embodiment of the kits of the present invention, the cushioning device is a large animal cushioning device.

In one embodiment of the kit of the present invention, the large animal includes a cow, a horse, a buffalo a goat and a pig.

In one embodiment of the kits of the present invention, the cushioning device when filled with the filling material is capable of withstanding an animal weighing more than about 400 Kg.

In another embodiment of the kits of the present invention, the cushioning device when filled with the filling material is capable of withstanding an animal weighing between about 400 Kg and about 1,200 Kg.

BRIEF DESCRIPTION OF THE DRAWINGS

FIG. 2 B is a cross section view of the cushioning device of FIG. 2 A through A-A. FIG. 2 C is a detailed view of FIG. 2 B illustrating different layers in accordance with one embodiment of the present invention.

FIG. 3 B illustrates a cross section of a cushioning device in accordance to one embodiment of the present invention showing a drop stitch structure.

FIG. 5 B is a detail view of the area indicated by dashed rectangle "a" of FIG. 5 A.

DETAILED DESCRIPTION OF THE INVENTION

Unless defined otherwise, all technical and scientific terms used herein have the same meaning as commonly understood by one of ordinary skill in the art to which this invention belongs. Also, unless indicated otherwise, except within the claims, the use of "or" includes "and" and vice-versa. Non-limiting terms are not to be construed as limiting unless expressly stated or the context clearly indicates otherwise (for example "including", "having" and "comprising" typically indicate "including without limitation"). Singular forms including in the claims such as "a", "an" and "the" include the plural reference unless expressly stated otherwise. All publications cited herein, as well as the priority document, are incorporated by reference in their entirety.

"Inflatable", as used in this document, means inflation with a suitable filling material. The filling material includes any suitable fluid or combination of fluids. Suitable fluids include gaseous compounds and/or liquids, including gels.

"Large animals" refer to livestock species such as cattle, buffalos, horses, sheep, goats, and pigs. The term "large animal" excludes pets, such as dogs and cats regardless of their size and weight.

The invention will be explained in details by referring to the figures.

The Cushioning Device

The present invention relates to a cushioning device that may be filled with a gaseous compound or a mixture of gaseous compound and a liquid. In one embodiment, the cushioning device of the present invention includes a drop stitch structure and a chamber configured for receiving an amount of the filling material capable of withstanding a large animal. As such, the present invention relates also to a large animal cushioning device.

Figure 1:
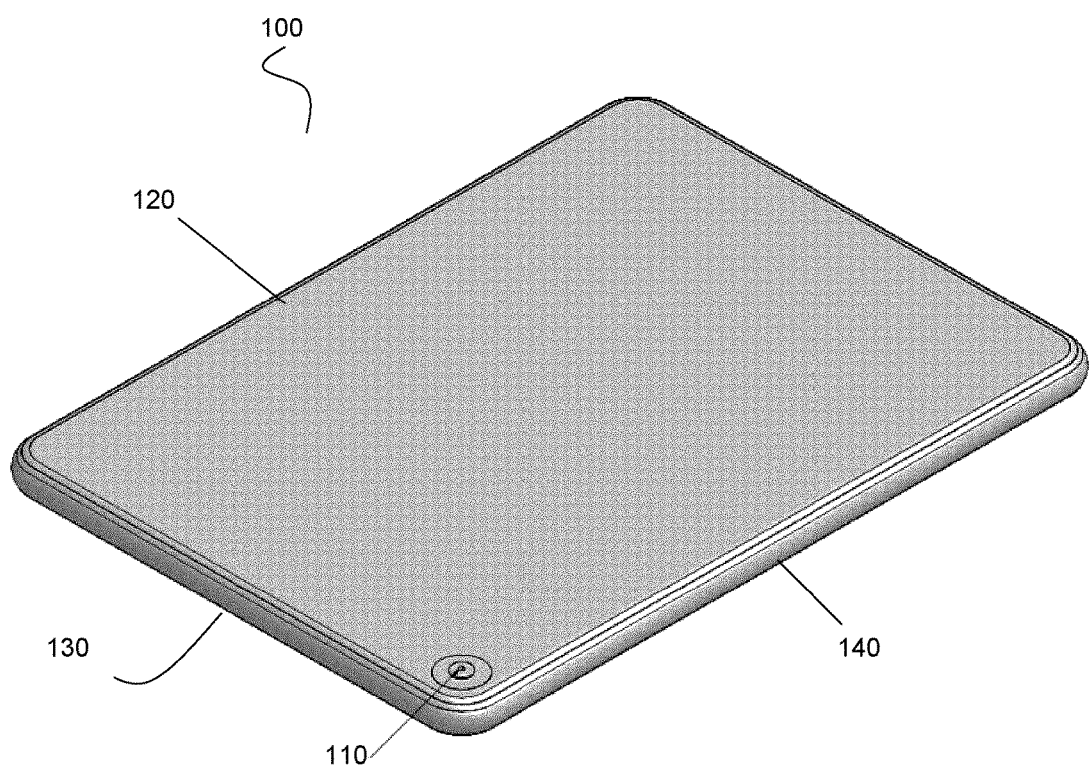
FIG. 1 illustrates an isometric view of a cushioning device in accordance to one embodiment of the present invention.

The cushioning device of the present invention may take an overall configuration which may be the same, or has similarities to, a mattress. As such, the cushioning device of the present invention may also be referred to in this document as a mattress. With reference to FIG. 1, reference numeral 100 denotes generally a cushioning device, which may comprise of an inflatable bladder capable of withstanding a large animal, such as cow or buffalo. A cow/bull may weigh between about 900 pounds and about 3,000 pounds. A buffalo may weigh between about 2100 pounds and about 2600 pounds. Accordingly, the cushioning device of the present invention may be capable of withstanding animals having a weight between about 900 pounds and about 2,600 pounds (between about 400 Kg to about 1,200 Kg). The cushioning device 100 of the present invention may comprise a top or first wall 120, and a bottom or second wall 130. The top and bottom walls 120, 130 may form a chamber. The chamber may be configured to receive a filling material for filling the chamber of the cushioning device 100. The cushioning device may also include filling/retrieving means such as a port 110 for disposing or retrieving a filling material into/from the chamber.

Figure 7:
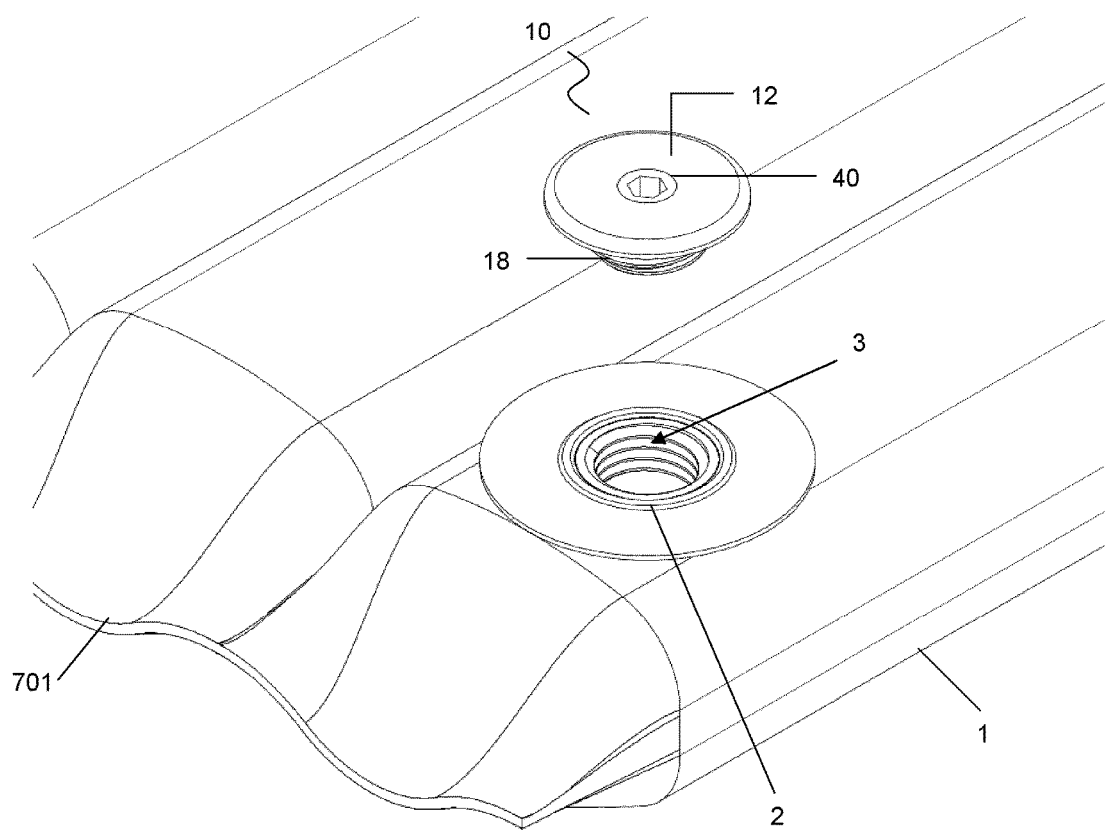
FIG. 7 is an isometric top view of one corner of an inflatable mattress, showing one valve cap with septum in accordance to one embodiment of the present invention shown above the filling port on the inflatable mattress.
Figure 8:
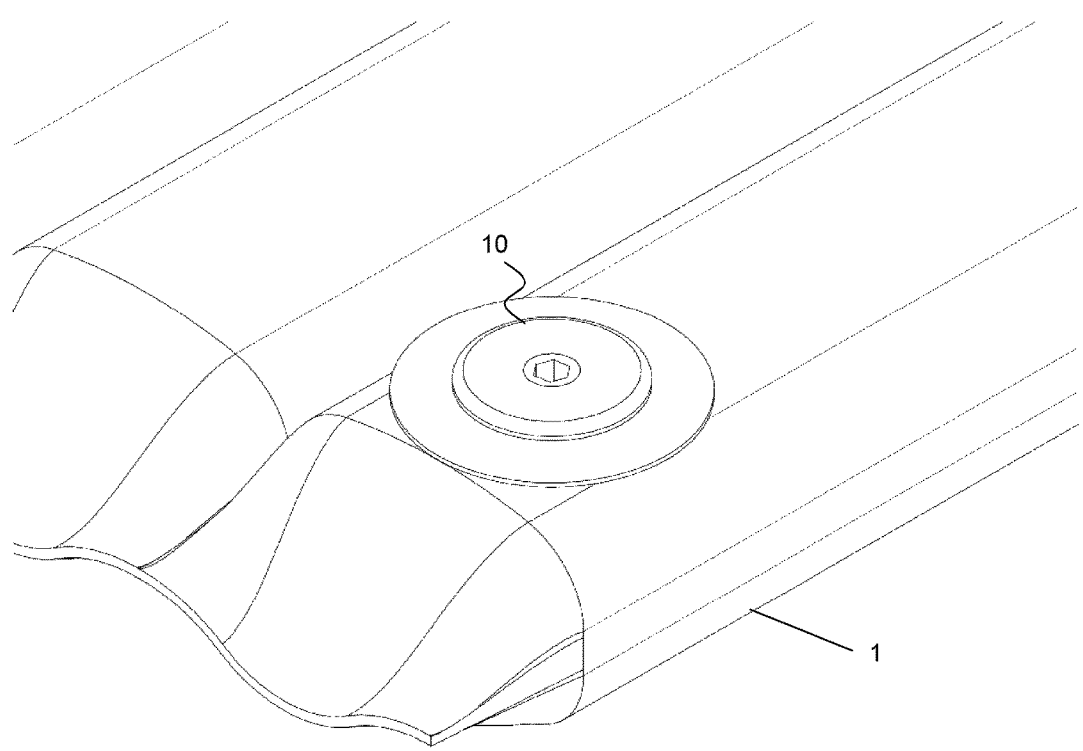
FIG. 8 is an isometric top view of one corner of an inflatable mattress, showing one valve cap with septum in accordance to one embodiment of the present invention installed on the inflatable mattress
Figure 9:
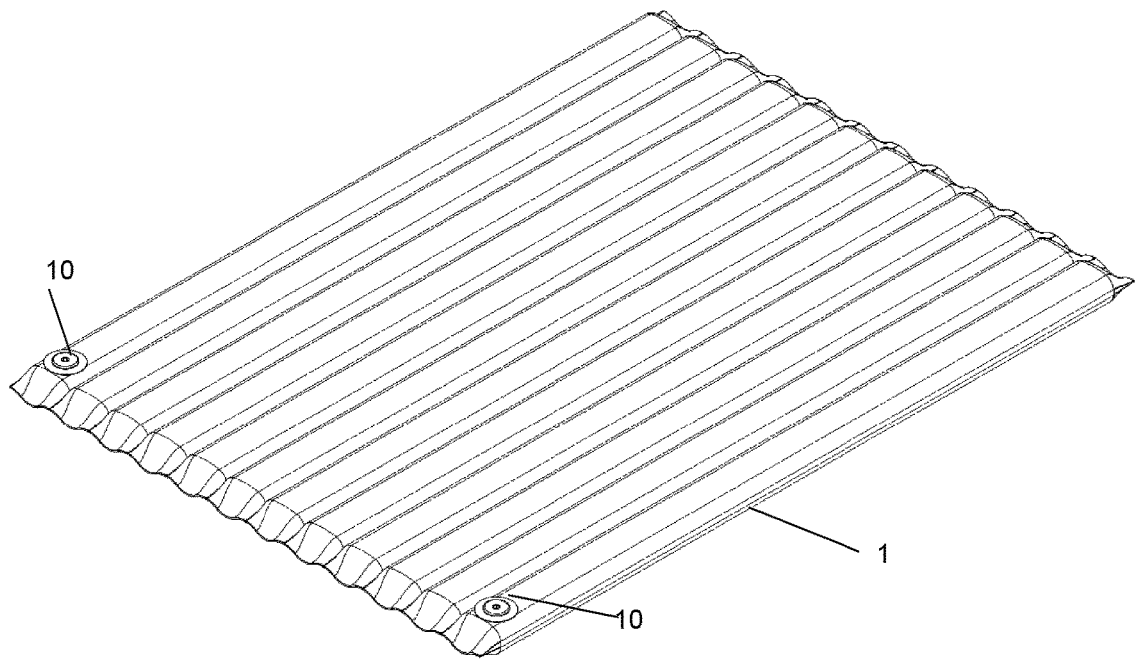
FIG. 9 is an isometric top view of an inflatable mattress including two valve caps with septa in accordance to one embodiment of the present invention.
Figure 10:
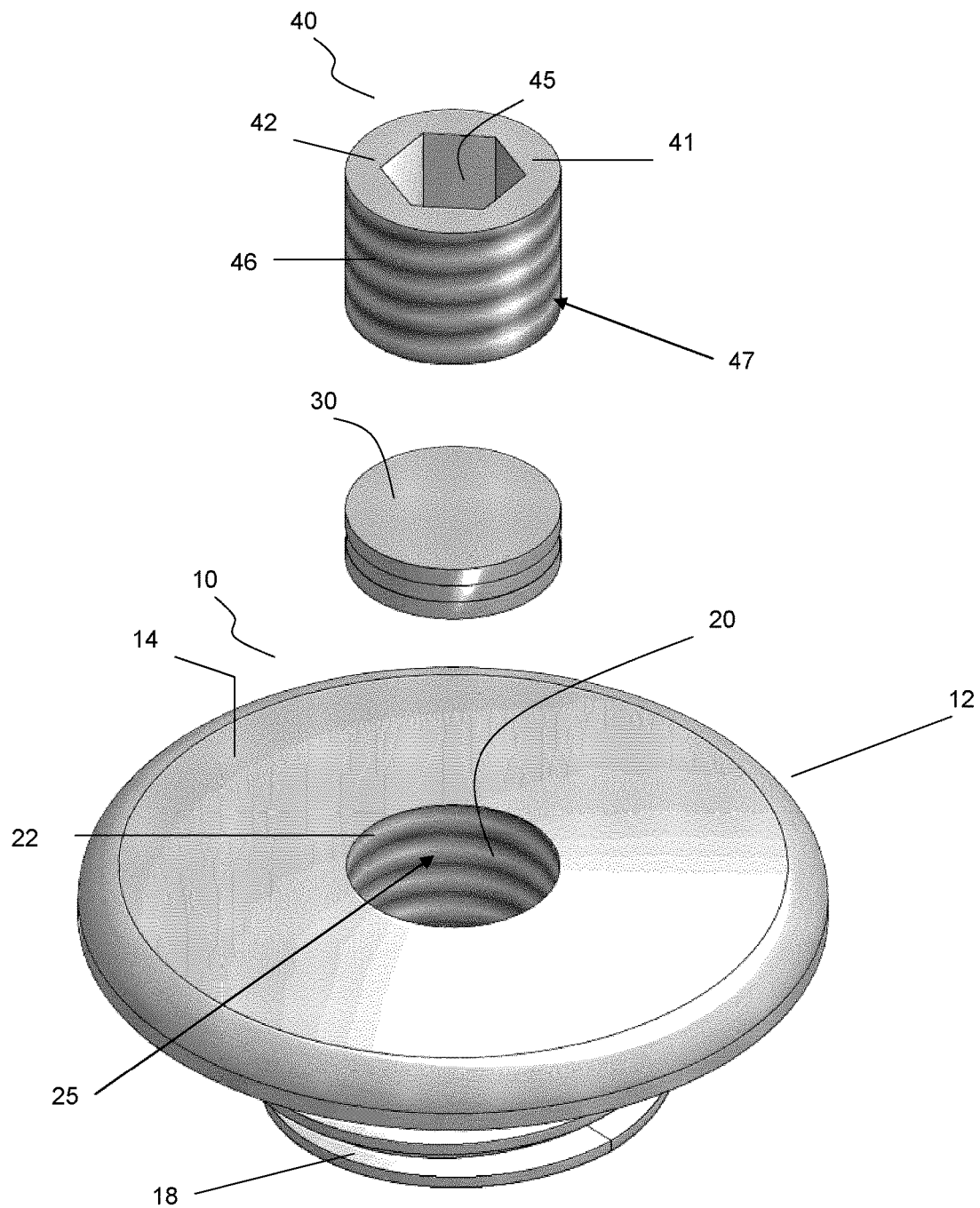
FIG. 10 is an isometric exploded perspective view from the top of a valve cap with septum in accordance to one embodiment of the present invention.
Figure 11:
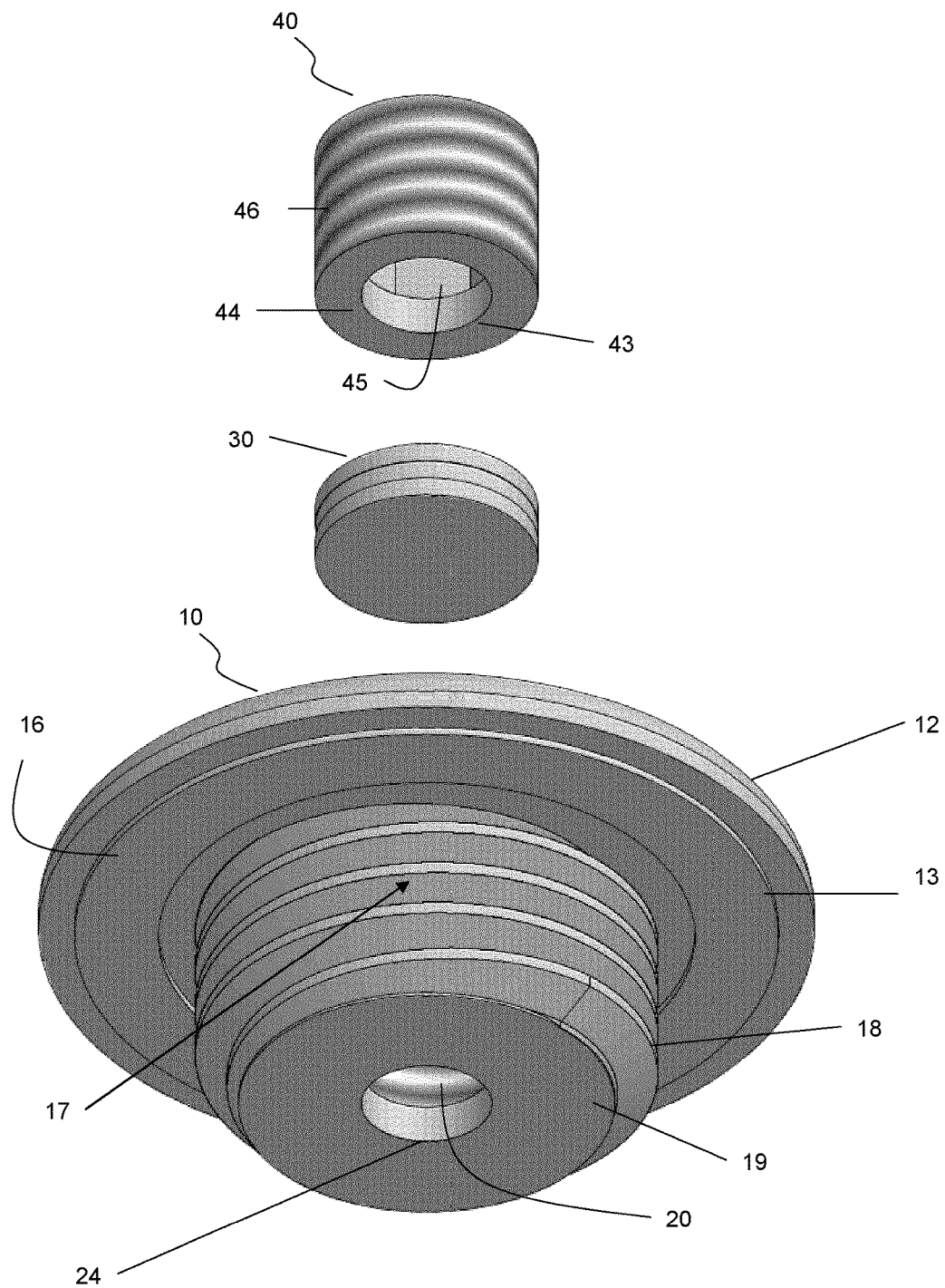
FIG. 11 is an isometric exploded perspective view from the bottom of a valve cap with septum in accordance to one embodiment of the present invention.

To form the chamber, the top and bottom walls 120, 130 may be connected at their peripheral ends throughout the periphery of the cushioning device 100 to form a peripheral structure. It may be necessary to seal the chamber to prevent the filling material from leaking out of the cushioning device. In this case, the top and bottom surfaces 120, 130 may be connected directly at their peripheral end by sealed end seams in order to create the sealed chamber (see in FIG. 7 end seams 701). Alternatively, the top and bottom surfaces may be connected at their peripheral ends to side walls 140, for example by sealed end seams.

Figure 2:
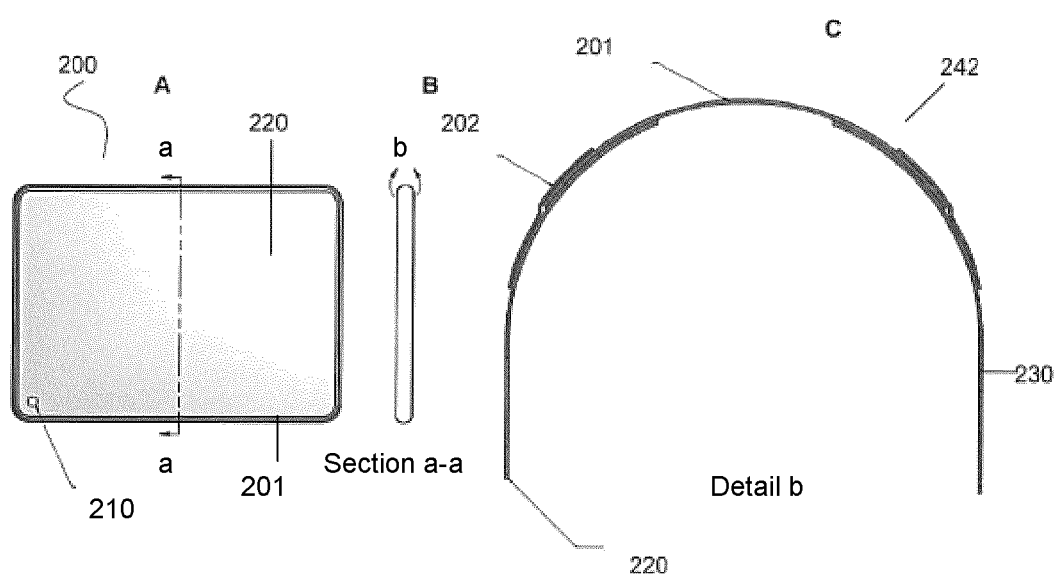
FIG. 2 A illustrates a top view of a cushioning device in accordance to one embodiment of the present invention.

Along the periphery of the cushioning device, additional layers may be used to couple the top and bottom surfaces. This configuration is shown in FIG. 2 for clarity. FIG. 2 illustrates a cushioning device 200 having a top wall 220 and a bottom wall 230 and a periphery or side wall 201. Also shown is a port 210. FIG. 2 C details a cross section of the cushioning device 200 (for convenience only, FIG. 2 C does not illustrate the drop stitch structure, which is illustrated in FIG. 3A and FIG. 3B). Item 201 designates a periphery having a layer which may be comprised of polyvinylchloride (PVC) which may include a scrim, which may be a nylon scrim. Items 220 and 230 designate the top and bottom walls of a mattress 200. The top and bottom walls 220, 230 may include an outer layer, which may be made of PVC, with scrim. Item 242 designates a portion of the periphery in which the scrim PVC 201 overlaps with the top or bottom surfaces 220, 230 forming the peripheral structure 242. The peripheral structure 242 may be provided with an additional layer 202, which may be made of a PVC without a scrim. Item 202 may serve to provide an additional liquid tight seal where Items 201 and 230 may be bound together. Item 202 may also serve to provide an additional means of transmitting the shear forces experienced in the joint between items 201 and 230.

Figure 3:
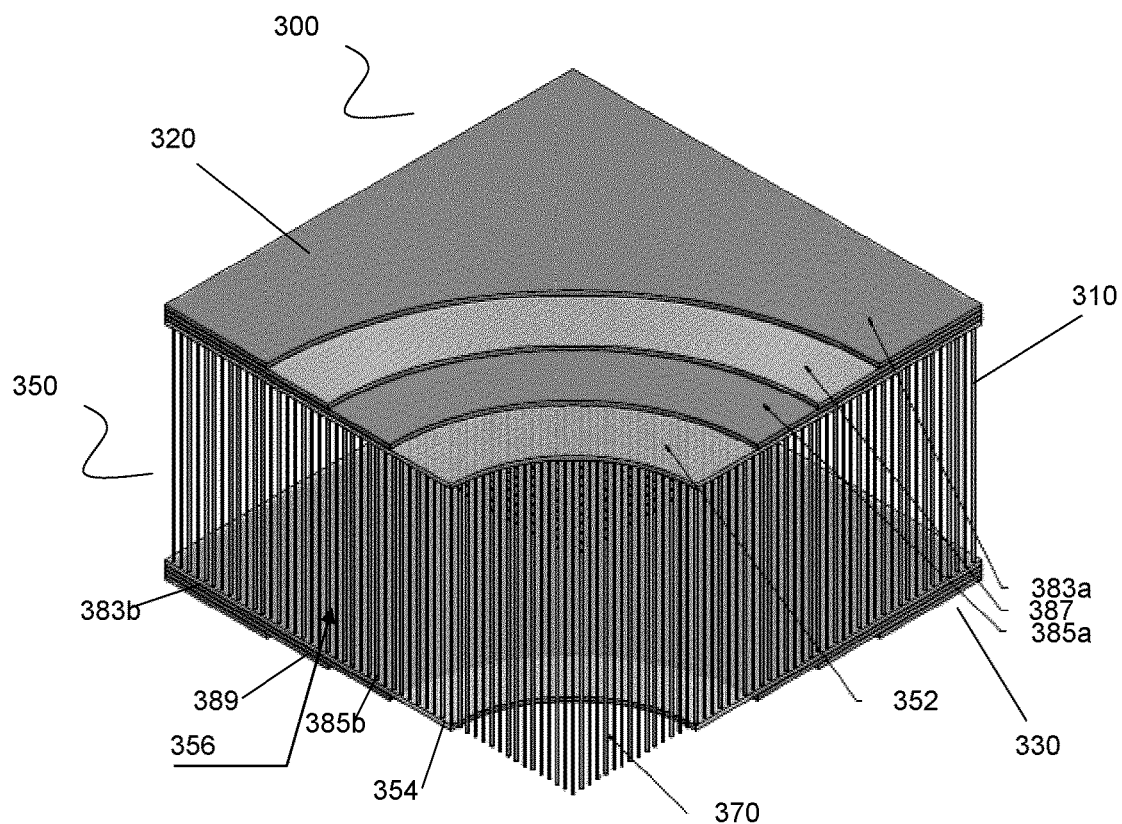
FIG. 3 A illustrates a cross section of a cushioning device in accordance to one embodiment of the present invention showing a drop stitch structure.
Figure 3:
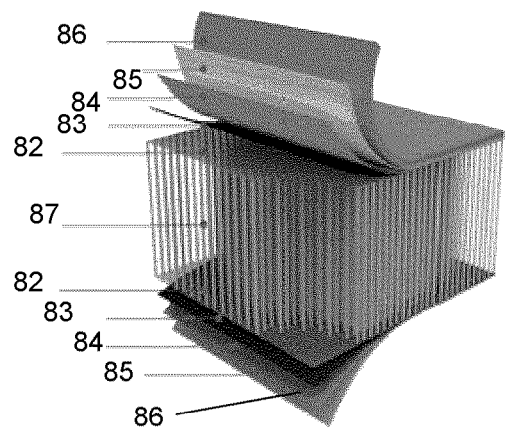

The basic structure of the cushioning device of the present invention includes a drop stitch structure. FIG. 3 A illustrates, in one embodiment, the top wall 320 and the bottom wall 330 interconnected by fabric stitching 370 to form a drop stitch structure 350 of the cushioning device of the present invention.

As shown in FIG. 3 A, the "drop stitch fabric" generally shown as 350 includes two opposing base layers 352 and 354, with a core section 356 positioned between (and connected to) the base layers 352 and 354. This core section 356 may include a plurality of individual threads or cords 370 which have upper and lower end portions which connect to, respectively, the upper and lower layers 352 and 354. Threads 370 may be made of any suitable material, such as nylon.

Each of the top wall and the bottom wall of the cushioning device of the present invention may be made of one layer or of at least one layer. As such the bottom and top walls may be made of 1, 2, 3, 4, 5 or more layers. FIG. 3 A illustrates a top wall 320 and a bottom wall 330 including four layers each. With reference to FIG. 3 A, the layers of the walls will now be described in order from the chamber 310 to the exterior surface of the cushioning device 300. In the embodiment shown in FIG. 3, the top and bottom walls 320, 330 may include two opposing base layers 352, 354 lining or covering the chamber 310. The opposing base layers 352, 354 may be connected by a drop stitch structure 350. The base layers 352, 354 may be a cloth or fabric made of nylon, ballistic nylon or similar materials, and they may serve to provide strength and durability to the cushioning device, as well as enable shape retention. The base layers 352, 354 may in turn be lined by a scrim layer, as shown in FIG. 3. The scrim layer may include two sheet layers having a scrim sheet in between. The scrim layer may, for example, be made of PVC sheets 383a,b, 385a,b having a nylon scrim 387, 389. The scrim layer may serve to provide a fluid tight seal, durability and resistance to degradation in harsh environments such as animal urine or feces. The base cloth 352, 354, and scrim layer may be laminated together.

FIG. 3 B shows another embodiment of a cushioning device having a drop-stitch structure. In this embodiment, the top and bottom walls include five layers each 82, 83, 84, 85, 86. Layers 82 may be based layers joined by a plurality of individual threads or cords 87.

Figure 6:
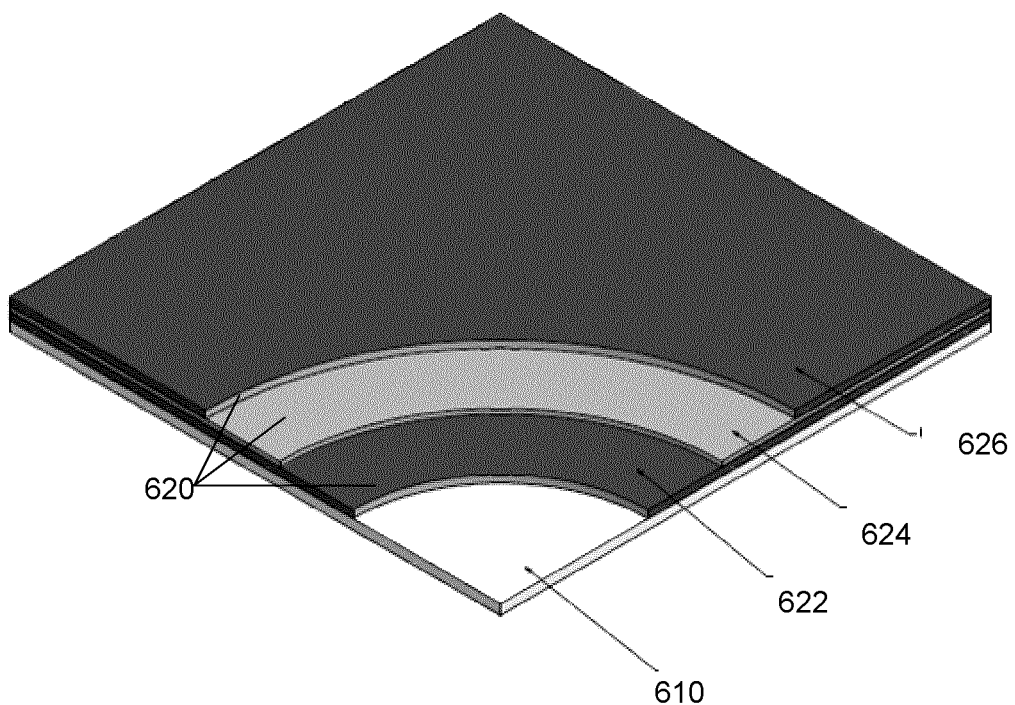
FIG. 6 is a perspective view illustrating the layers of a wall of a cushioning device for large animals in accordance with one embodiment of the present invention.

FIG. 6 illustrates the different layers forming a wall of the cushioning device of the present invention: the base layer 610 that covers or line the chamber of the cushioning device and forms part of the drop-stitch structure, and the scrim layer 620. The base fabric layer 610 may be a polypropylene fabric layer. The scrim layer 620 may include two PVC sheets 622, 626 and a scrim sheet 624, which may be made of, but not limited to, nylon, ballistic nylon, nylon 6, polyester, or similar fabric like materials in between the two PVC sheets 622, 626.

Figure 4:
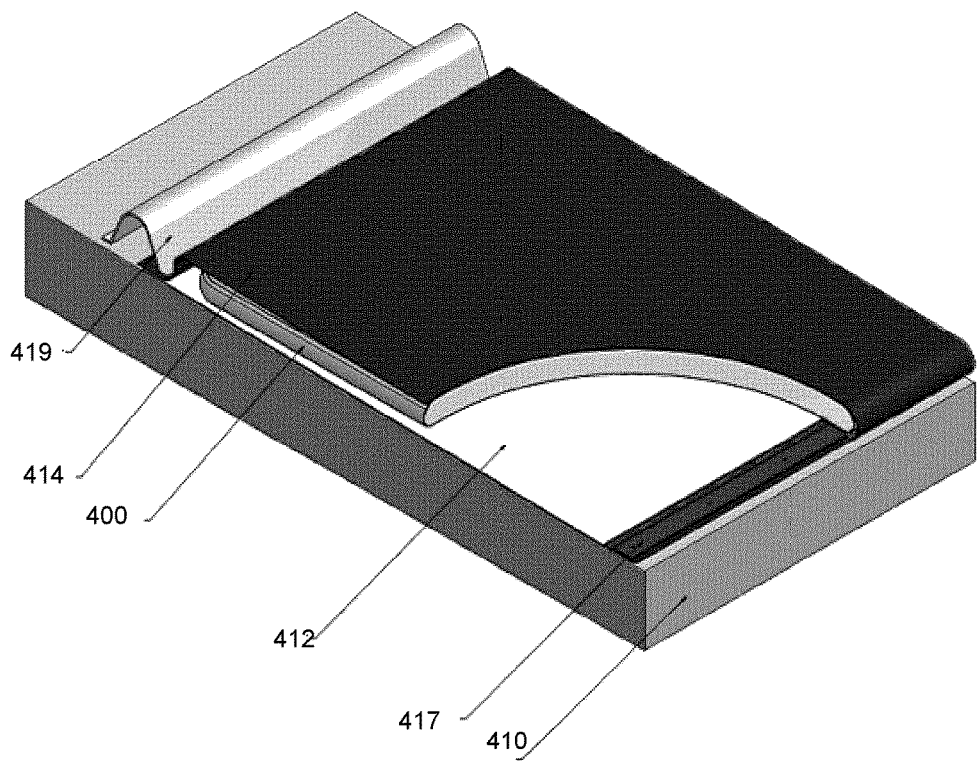
FIG. 4 is a perspective view of a cushioning device for large animals in accordance to one embodiment of the present invention illustrating a cushioning device installed.

As illustrated in FIG. 4, the cushioning device 400 of the present invention may be placed over a deck 410, such as a concrete deck. A protective, abrasion resistant sheet 412 may be used to line the deck 410, and adjacent to the bottom surface of the mattress 400. Protective sheet 412 may be a suitable polypropylene fabric. An abrasion resistant cover sheet 414 may be used adjacent to the top surface of the cushioning device 400. The abrasion resistant cover sheet 414 may be made of polypropylene or a suitable rubber material. One or more coupling means 417, 419 may be used to maintain the cushioning device 400 substantially immobilized on the deck. Item 419 may take the form of a plastic arch/barrier. Item 417 may take the form of a plastic strip.

The cushioning device of the present invention may be inflated utilizing a filling station in fluid communication with one or more ports on the cushioning device enabling the introduction of the filling material in/from the chamber. In one embodiment, the filling station may dispose a liquid, a gaseous compound or a mixture of the aforementioned filling materials into the chamber of the cushioning device. Subsequent to the cushioning device being sufficiently inflated it may be manually disposed on the deck. According to another embodiment of the invention, the cushioning device may subsequently be covered with a protective sheet 414. One or more coupling means, 417, 419 may be used to maintain the protective sheet and cushioning device substantially immobilized on the deck 410.

Figure 5:
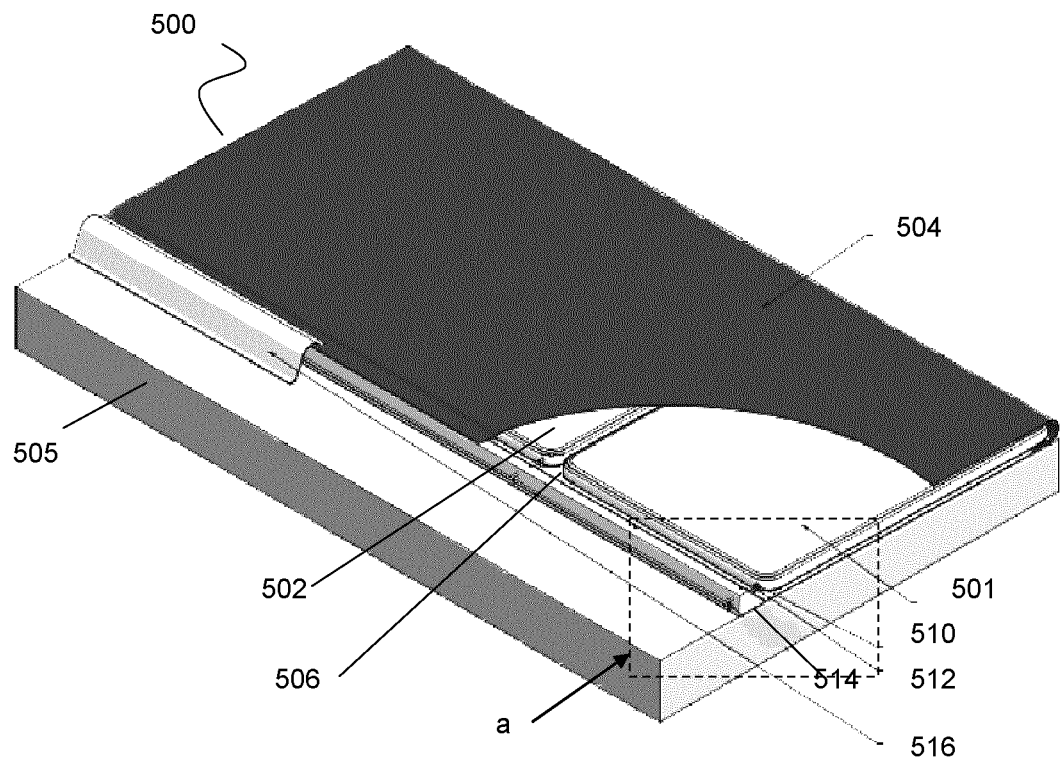
FIG. 5 A is a perspective view of a system of cushioning devices for large animals in accordance to another embodiment of the present invention.
Figure 5:
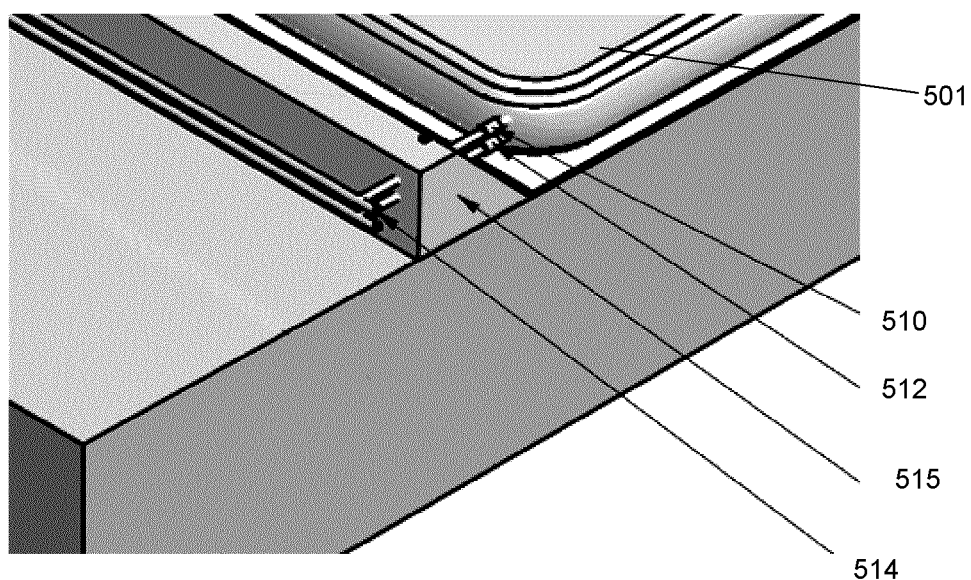

The cushioning device of the present invention may include one or more means for disposing and retrieving the filling material in/from the chamber. In one embodiment, a standard port may be provided on the cushioning device to permit entry and exit of the filling material to/from the chamber (see for example item 110 of FIG. 1). In one embodiment, the port may be comprised of an inlet or intake port and an outlet or exhaust port. A single port may be used to enable the inflation and/or installation of the cushioning device of the present invention with the filling materials. FIG. 5 A illustrates an exhaust valve 510 and an intake valve 512 which may be included in each mattress 501, 502. In one embodiment, the one or more ports for disposing and retrieving the filling material may be in fluid communication with a powered or non-powered reservoir including but not limited to a pressurized fluid reservoir, gas compressor or fluid pump. The cushioning device may be inflated by providing a means of fluid communication to the aforementioned reservoir through the implementation of a fluid conduit. FIG. 5 A illustrates a fluid conduit, trunk line 514 which may communicate a fluid reservoir with a plurality of cushioning devices.

FIG. 5 B illustrates detail of dashed rectangle a, in which the exhaust port check valve 510, the inlet port check valve 512, the trunk line 514 to reservoir, and drop stitch mattress 501. Item 515 illustrates a spacer wedge.

The Filling Material

In the present invention the filling materials may include one fluid, or a mixture of fluids having different viscosities or being in different physical states. As such, in one embodiment, the filling material may include or consist of a gaseous compound, including a mixture of gases. In other embodiments the filling material may be a mixture of a gaseous compound such as air, and substances in liquid state, such as water and gelatinous materials.

The gaseous compound may be an inert gas. Examples of gases that may be used to fill the cushioning device of the present invention include air, nitrogen and argon. Other gases may also be used.

The liquid may include a gelatinous filling material. The gelatinous material may be provided as a compound, preferably substantially dry or powder form that creates a gel when in contact with a liquid solution such as water. Examples of such a compound for creating the gelatinous material may include a polymer such as a superabsorbent polymer (SAP). SAP is commonly used in the hygiene industry, particularly in the manufacture of diapers to absorb body fluids. As such, a preferred material for providing a gelatinous filling material may be in the form of a powder or granules made up of SAP, and the powder or granules may be interspersed throughout the chamber. An example may be the sodium polyacrylate AP95 OS produced by Evonik Stockhousenr®.

When SAP is in contact with a liquid, such as water, it creates a gel that can last as a gelatinous material for many years when inside a sealed chamber.

SAP that may be used in the present invention include absorbent polymers that absorb liquids and are commonly used in the manufacture of sanitary articles. SAP that may be used in the present invention include polymers that absorb over 50 times, more preferably over 75 times, even more preferably over 100 times, its weight in water. Non-limiting examples of SAP that may be used according to the present invention include sodium polyacrylate, sodium polyacrylamide, and potassium polyacrylamide.

The high viscosity of the gelatinous filling material that may be included within the chamber of the cushioning device may create impact absorption to absorb energy peaks. Also, the conformability of the gel may help reduce the pressure points on joints or extremities of the large animal, which may result, in the case of cows, in an increase in the milk production.

If a mixture of gas and gelatinous material are used to fill the chamber, the cushioning device may include about 1-20% v/v % gas and 80-99% v/v % gelatinous material, and any possible range of gas to gelatinous material therein between.

System

In another embodiment, the present invention relates to a system for providing comfort to large animals. The system may include (a) at least one cushioning device of the present invention, and (b) a source of filling material in connection with the at least one cushioning device.

The system, in another embodiment, may include: (a) one or more cushioning devices, each cushioning device including a chamber configured for receiving a filling material, and (b) a source of filling material in connection with the one or more of cushioning devices. In one aspect, the one or more cushioning device may include a drop stitch structure. In another embodiment, the cushioning device is a large animal cushioning device.

The one or more cushioning devices may be interconnected to one or more reservoirs of filling material that enables the adjusting or maintaining pressure once the mattresses are installed; the adjustment may be based on animal attributes (health, weight) or compensating for the stretching/aging of the mattress. The system may include a trunk line connecting the one or more cushioning devices to a source of filling material, such as a gas reservoir. The mattresses and connections in the system may be maintained at a desired pressure. If a mattress in the system falls below the pressure at which the system is set, then, because of pressure differential, the system automatically (i.e. without the input of an operator) fills the mattress, thereby bringing the pressure back to the system's pressure.

In one particular embodiment, the system may include a plurality of cushioning devices of the present invention and the source of filling material.

Shown in FIG. 5 A and in FIG. 5 B is a system 500 of a plurality of drop-stitch, large animal cushioning devices of the present invention 501, 502. The cushioning devices 501, 502 may be placed on top of a deck 505 lined with a protective layer 506, which may be made of PVC. The cushioning devices 501, 502 may be covered by a cover 504 which may be made of PVC or a suitable rubber material. For illustration purposes only, a portion of the rubber cover 504 is cut-out to show cushioning devices 501, 502, but it should be understood that the system may include 2, 3, 4 or more cushioning devices.

The cushioning devices 501, 502 may include intake valves 512, and exhaust valves 510. Each intake valve 512 includes an intake check valve configured for allowing filling fluid to flow into the cushioning device 501, 502, while preventing the fluid from flowing out of the cushioning device 501, 502. Each exhaust valve 510 includes an exhaust check valve configured for allowing filling fluid to flow out of the cushioning device 501, 502, while preventing fluid from flowing back into the cushioning device 501, 502. Each exhaust valve may be connected to an exhaust conduit included in a trunk line 514. Each intake valve 512 may be preferably connected to an intake conduit included in the trunk line 514.

Through extension of the trunk line 514 each intake valve 512 is in communication, such as fluid communication, with a powered or non-powered fluid reservoir including but not limited to a pressurized fluid reservoir, gas compressor or fluid pump (not shown). The exhaust valve through extension of the trunk line 514 may be in fluid communication with a pressurized fluid reservoir, or atmosphere through the implementation of a pressure regulator (not shown). Generally, the fluid included in the supply and exhaust reservoir is a gaseous compound, however, a liquid such as water, or a mixture of gas and liquid may also be suitable.

The weight of a body such as a cow resting, or standing, or the impact of a cow in transition from the resting to standing position and vice versa may deform the chamber of a cushioning device. Thus the pressure of the fluid within each chamber increases as the volume of the chamber decreases under deformation. As the pressure of the fluid increases, the fluid in the affected cushioning device(s) flows out of the chamber through a corresponding exhaust valve and into the pressure regulated trunk line and reservoir. The aforementioned sequence of events occurs such that the entire system remains substantially close to or at equilibrium, thereby maintaining the desired level of comfort throughout the entire spectrum of events imposed by animal occupancy.

Valve Cap with Septum

The present invention, in another embodiment, additionally provides means for the re-pressurization of an inflatable bladder such as the cushioning device of the present invention subsequent to installation of the inflatable mattress. In one embodiment, the re-pressurization may be achieved through the incorporation of a septum or check valve or equivalent within the valve cap that facilitates fluid communication with regions exterior to the chamber of the inflatable bladder.

The present invention also provides for a cap with septum for use in an inflatable bladder such as gas, liquid or both liquid and gas filled mattresses where it may be desired to re-pressurize the bladder by adding relatively small amounts of fluid, such as gas, liquid or a mixture of gas and liquid. In one embodiment of the present invention there is provided a cap for sealing a filling port of an inflatable bladder having a chamber, the cap comprising (i) a main body, (ii) a connector extending from the main body, the connector designed for interfacing with the filling port of the inflatable bladder, and (iii) a septum disposed in the cap such that an inflation member, such as a needle, can be inserted through the septum and into the chamber of the cushioning device.

With reference to FIGS. 7 to 11, the cap 10 of the present invention may include a main body 12 with a top wall 14 and a bottom wall 16. Bottom wall 16 may include a gasket 13 for better sealing the filling port. Extending from the bottom wall 16 there is a connector or throat 18 configured for engagement to or interfacing with a filling port 2 of an inflatable bladder 1 and having a free bottom wall 19. The connector 18 may include external threads 17 that may match threads 3 in the filling port. Alternative to the threads, the connector may include one or more ribs or rings made of a flexible material like rubber, for frictionally engaging the filling port. The cap 10 includes a channel 20, which may be centrally located, that extends from an opening 22 on the top wall 14 through the main body 12, through connector 18, and ending in an aperture 24 on the bottom wall 19 of the throat 18. The two opposing openings 22, 24 may be arranged substantially co-axially on axially opposite ends of the channel 20. Opening 24 may be smaller in diameter, including slightly smaller, than opening 22. The side walls 25 of channel 20 may be threaded.

The septum 30 may be configured for essentially fitting inside channel 20. Within the channel 20, septum 30 may sit on the inside surface of throat's 18 bottom wall 19 thereby covering opening 24. The septum may be frictionally engaging the side walls of the throat. Septa may be made from silicone, rubber, or other similar materials. The trait that these materials have is that when a needle is pushed through them, the septum seals around the needle during insertion, and then when removed, the needle hole closes back up and seals again.

A plugging device, such as a plug 40, may be used to retain the septum 30 in place within cavity 20 and covering opening 24. Plug 40 may include a top wall 42, a bottom wall 44 and side walls 46. Side walls 46 may include threads 47 matching the threads of the side walls 25 of throat 18. Instead of threads, side walls of the plug may include one or more ribs or rings that would frictionally engage with the side walls of the cap's cavity. Plug 40 may include a hole 45, which may be centrally located, having two openings 41, 43 that may be arranged substantially co-axially on the axially opposite top and bottom walls 42, 44 of the plug 40 respectively. Opening 41 may be designed to receive the head of bit of a screwdriver or other devices such as a hex key.

Figure 12:
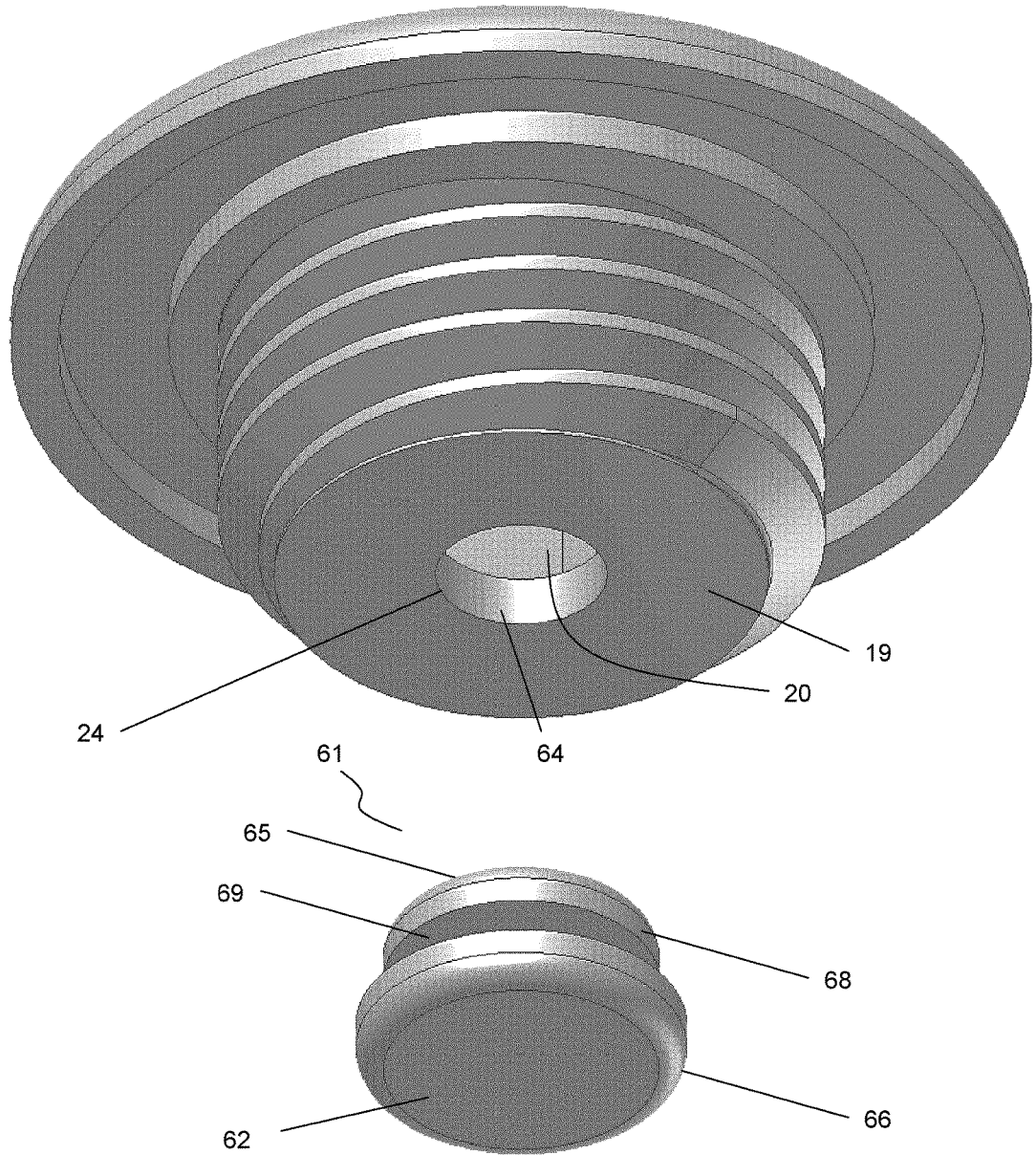
FIG. 12 is an isometric perspective view from the bottom of a valve cap and a grommet with septum in accordance with one embodiment of the present invention.

Referring to FIG. 12, another embodiment of the cap with septum of present invention is illustrated. When referring elements of the cap, the same reference numbers of FIGS. 7-11 will be used for convenience. In this embodiment, the septum 62 may be provided in a grommet 61 that may be inserted into the aperture 24 located on the bottom wall 19 of connector 18 of the cap 10. Grommet 61 may include an external flange 66 and an internal flange 68. The external flange 66 and the internal flange 68 define a groove 69 there in between. The internal flange 68 may include a surface 65 designed for easier insertion of the grommet through the aperture 24. For example, surface 65 may be tapered. When inserted, the internal flange 68 becomes disposed in the interior of channel 20 of cap 10, while the external flange may remain adjacent to the bottom wall 19 of the cap 10. The groove 69 is adapted to receive a lip 64 of the aperture 24 disposed on the bottom wall 19 and may establish a seal between the grommet and the lip of the aperture 24. The groove 69 and flanges 66, 68 may have a contour which is complementary to the shape of the aperture 24. That is, the shape of grommet 61 may be designed to fit any specific aperture opening or shape such as circular, square, rectangular, etc. by changing the contours of the internal and external flanges. An improvement of the grommet of the present invention is that it includes a septum 62. Septum 62 may be disposed within the external flange 66. The grommet of the present invention may be made of any suitable material, preferably from a resilient or elastomeric material such as polyurethane.

Figure 13:
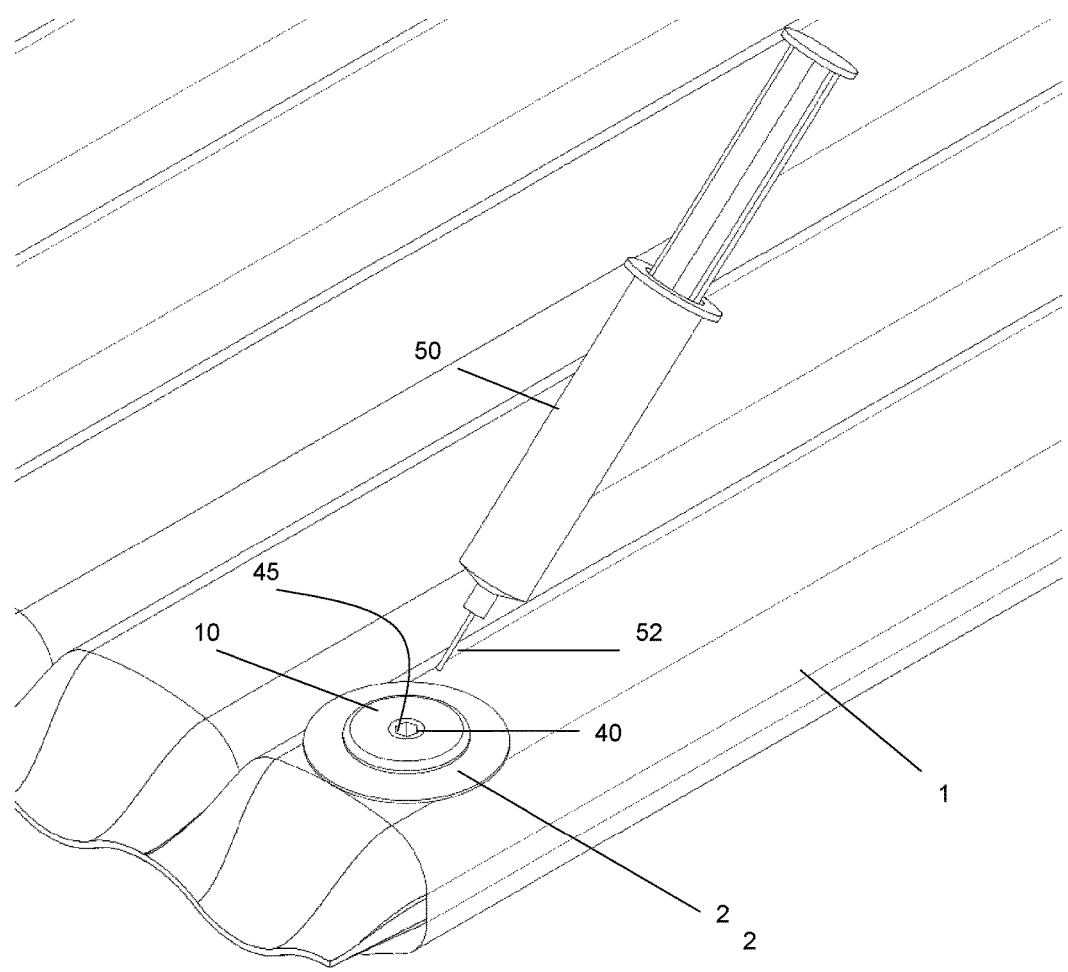
FIG. 13 is an isometric top view of one corner of an inflatable mattress showing one valve cap with septum installed on the inflatable mattress, with a syringe of filling fluid shown in position ready to be inserted into the valve cap with septum in accordance to one embodiment of the present invention.
Figure 14:
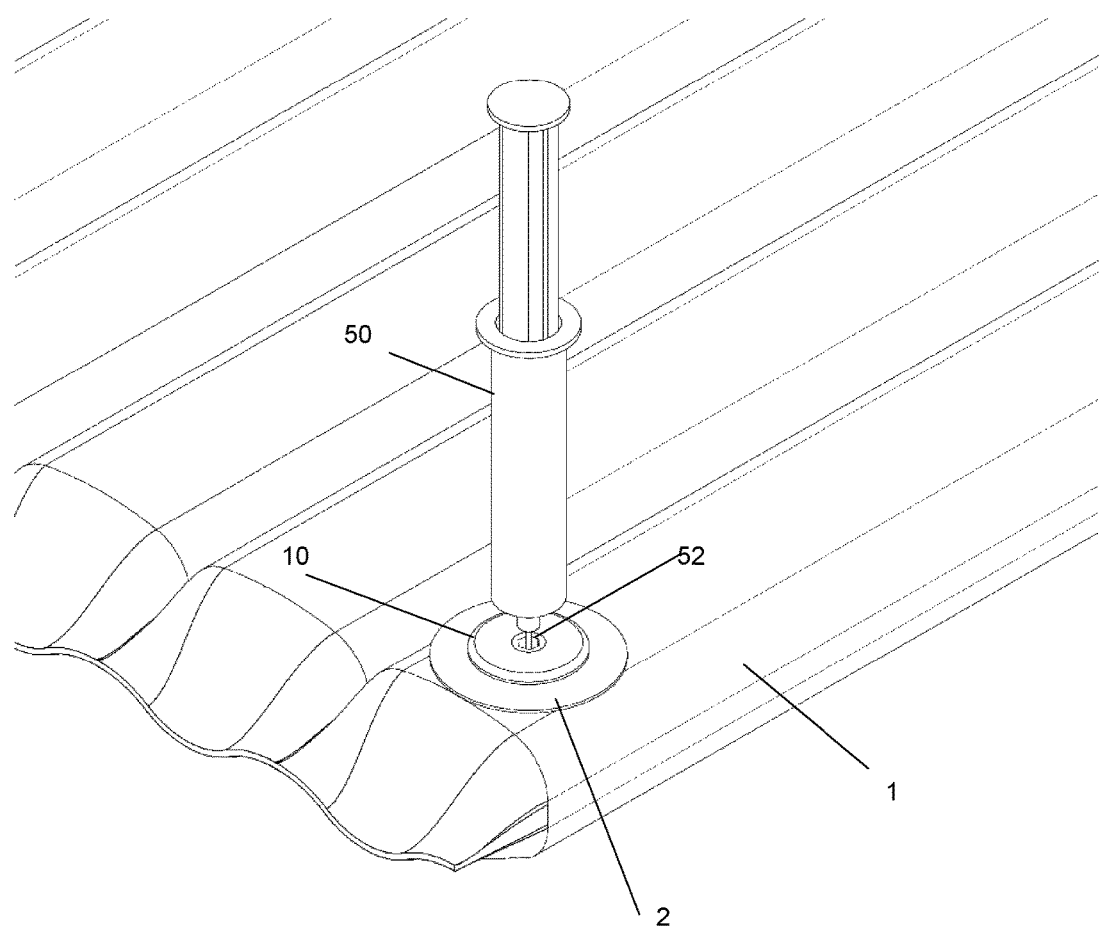
FIG. 14 is an isometric top view of one corner of an inflatable mattress showing a valve cap with septum installed on the inflatable mattress, with a syringe of filing fluid shown inserted through the septum of the valve cap in accordance to one embodiment of the present invention.

With reference to FIGS. 13 and 14, hole 45 may be designed to allow a needle 52 go through it and be inserted through the septum and into the filling port 2 of the inflatable bladder 1.

The inflation needle should be a non-coring needle. This means that the needle can spread open the septum, but will not puncture a hole in it. The inflation needle may be connected to a source of filling material. FIGS. 13 and 14 illustrate an inflation needle 52 connected to a syringe 50 having a filling material. The inflation needle may alternatively be connected directly to a hose or pump to push the filling material into the inflatable bladder.

In assembling the cap of the present invention, the septum may be positioned within the channel of the cap, preferably sitting on the bottom wall of the cap's connector and covering the connector's bottom wall's opening. When a plug is used to retain the septum in place, the septum may be inserted through the opening on the top wall of the main body first and then the plug is inserted in the cavity, for example manually or using a screw driver, a hex key or any other suitable device, to keep the septum in place.

The cap of the present invention may be used to seal an inflatable bladder such as an inflatable mattress, by connecting the connector or throat of the cap into a filling port of the inflatable mattress. With reference to FIGS. 13 and 14 if the mattress needs more internal pressure, in operation, a suitable needle 52 connected to a syringe 50 or to other device containing a filling material, may be inserted into the plug's 40 hole 45, through the septum within the cavity and into the filling port 2 of the inflatable bladder 1. The filling material may then be pushed into the inflatable bladder 1, as illustrated in FIG. 14, until a desired internal pressure is attained. The needle 52 may then be retrieved from the plug's 40 hole 45.

The cap of the present invention may be used for filling relatively small amount of filling fluids or gas into an inflatable bladder, such as the cushioning device of the present invention, through the septum with a suitable member such as a needle. The advantage is that it will be much simpler and faster to add relatively small amounts of filling material to the inflatable bladder if the inflatable bladder were to become soft, for example, because of the material stretching, which may often occur in the case of inflatable mattresses for large animals due to the weight of the large animals.

The cap with septum of the present invention provides an easy way to add fluid or gas the cushioning device of the present invention or to any other inflatable bladder. Adding filling fluid or air through the septum allows to leave the inflatable bladder closed, which saves time.

Delivery and Installation of the Cushioning Device

In one embodiment, the present invention provides for a kit comprising (a) a cushioning device according to one embodiment of the present invention and (b) a compound capable of creating a gelatinous filling material when in contact with a liquid solution such as water. The kit may also comprise instructions on how to install and/or care for the cushioning device. The kit may also comprise a cover for covering said cushioning device. The kit may also comprise a layer of protection for under the said cushioning device. The kit may also include a fluid reservoir and/or trunk line mentioned above.

In another embodiment, the present invention also provides for methods of transporting, delivering, distributing or shipping a cushioning device of the present invention to a site, such as a stall in a farm or a distributor of the cushioning device. These methods may be particularly useful to keep the shipping volumes and weights to a minimum. When the filling material includes a mixture of gelatinous compound and gas, one such method of transporting a cushioning device to a site may comprise delivering to the site the cushioning device with an amount of a compound capable of creating the gelatinous material when in contact with a liquid already disposed within the chamber. The amount of compound to be used would depend at least on the compound being used, and the dimensions of the chamber. For example, the dimensions may create a chamber that can hold approximately 100 litres of water, and a certain SAP can absorb a ratio of 1:100 by weight. In this case, the amount of SAP needed may be about 1 kg. The cushioning device with the compound disposed in the chamber may, for example, be packaged in a container for transportation to the site. At the installation site an amount of the liquid may be introduced into the chamber thereby creating the gel within the chamber and, when a mixture is used, an amount of a gas and installing the cushioning device at the site.

Alternatively, the cushioning device and an amount of the compound capable of creating the gelatinous material upon contact with a liquid may be delivered separately to the site (i.e. the compound is not disposed within the chamber). The cushioning device and the amount of compound may, for example, be packaged in a container for transportation to the site. The compound may be provided, for example, in a plastic bag. The amount of compound to be delivered may depend, as provided before, at least on the compound being used and the dimensions of the chamber. At the remote site the compound may be disposed within the chamber and the chamber may then be filled with an amount of liquid to create the gelatinous filling material within the cushioning device. A gaseous compound may also be introduced within the chamber.

When filling the cushioning device, a balance between the comfort of the large animal such as a cow or a horse, and the clean-ability of the surface of the cushioning device may be maintained. Clean-ability affects the work input for the farmer and the hygiene for the cow. Both comfort and hygiene can affect the milk production levels of a cow.

The inventors discovered that a preferable balance between comfort and clean-ability may be achieved when the chamber of the cushioning device has a positive pressure, that is a positively past the atmospheric pressure. This pressure within the chamber may range from about 0.1 psi to about 12 psi when there is no large animal on the cushioning device. This positive pressure may ensure that, for example, when there is not a cow on the cushioning device, the cushioning device of the invention may remain in the fully inflated form without any indentations or low spots in the walls. When there are no indentations or low spots, the mattress may be easier to clean and the liquid matter may drain properly. However, within this range of positive pressure, since the large animals are heavy, they may still be capable of indenting the mattress, which is critical for animal comfort.

Depending on the material being used to manufacture the cushioning device, such as a mattress, there may be some elastic and some permanent stretch in the material. In a preferred configuration, reinforced PVC may be used with internal glue and threads for the construction. This leads to a mattress having a relatively small amount of permanent stretch after it is first used. Thus, in order to maintain the positive pressure (as described above), the mattress may need an extra preload during installation. The preload may vary depending on the material of the mattress, but for the preferred configuration, the preload may be about 2 psi. Thus the installation pressure in the cushioning device may be between about 2.1 psi and about 14 psi. It is expected that this preload installation pressure may drop to a desired final pressure during the first month of use of the cushioning device.

To achieve the right pressure within the cushioning device of the present invention, an installer may use a manual valve with a pressure gauge to achieve the right pressure. Gas may be included to achieve the desired pressure. The pressure may also be automatically regulated using the manifold system previously described.

Advantages

Advantages of independent (i.e. not in fluid communication) cushioning devices (gas only or hybrid gas/gel) of the present invention include: inclusion of gas, such as air, further aids in impact absorption when animal gets up and down in comparison to existing cushioning device or mattress systems; simplified installation procedure as compared to similar mattresses or cushioning devices; adds to the longevity of the mattress; compensates for stretching of PVC; added compensation for temperature fluctuations; drop-stitch structure makes mattress cushioning devices of the present invention substantially or completely flat which helps keep it clean; i.e. more hygienic for the animal; low transportation costs, because fluid may be added at installation site.

Advantages of cushioning devices with manifold system—could be just gas or Hybrid (gel/gas), include: improved impact absorption which may benefit health of the animal; variable pressure settings for comfort customization depending on animal attributes (weight, health); uniform pressure throughout all cushioning devices in the system, which are in fluid communication; continued comfort compensation as the cushioning device ages and stretches; drop-stitch structure makes mattress or cushioning device substantially or completely flat which helps keep it clean; i.e. more hygienic for the animal, and less labour intensive to clean; lightweight at installation (air), good ergonomics for installation technicians; enables compensation for temperature variations within filling fluid; mat size can be for 1 or more animals e.g. 1 to 5 or more animals; decreasing amount failure areas; and further simplifying installation.

Other unique attributes of the cushioning devices and systems of the present invention include: drop stitch has never been used in mattress system, including mattresses for large animals; provides unique substantially or completely flat surface for animal; uses a combination of fluids and gases to achieve cushioning effect; the device may remain in fluid communication with exterior regions, such as an air reservoir through at least one inlet and maybe one exhaust line; polypropylene fabric layers for extra protection against abrasion during usage.

The above disclosure generally describes the present invention. Changes in form and substitution of equivalents are contemplated as circumstances may suggest or render expedient. Although specific terms have been employed herein, such terms are intended in a descriptive sense and not for purposes of limitation. It is to be understood that the present invention is not limited to the embodiments described above, but encompasses any and all embodiments within the scope of the following claims.

What is claimed is:

1. A large animal cushioning device, the large animal cushioning device comprising:
   a drop stitch structure,
   a chamber filled with an amount of a filling material that exerts an installation pressure inside the chamber, the filling material being a mixture of a gaseous compound and a gelatinous material, and
   a gas supply reservoir in fluid connection with the chamber of the cushioning device that supplies the gaseous compound to the chamber, the gas supply reservoir configured for maintaining the installation pressure inside the chamber.

2. The cushioning device of claim 1, wherein the cushioning device further comprises: (a) a top wall that is a generally flat surface and (b) a bottom wall, the top and bottom surfaces being connected by the drop stitch structure, the top and bottom walls forming the chamber, wherein the amount of filling material exerts the installation pressure against the top and bottom walls such that before use by the large animal the top wall stretches up to 10% of its original size, the cushioning device having the installation pressure inside the chamber, the installation pressure inside the chamber being from about 2.1 PSI to about 14 PSI such that after use by the large animal the top wall returns to its generally flat surface.

3. The cushioning device of claim 2, wherein the drop-stitch structure comprises two opposing base layers connected by a plurality of threads, and wherein the two opposing layers directly line the chamber of the cushioning device.

4. The cushioning device of claim 3, wherein each of the top and bottom walls includes (i) a base fabric layer directly lining the chamber, the base fabric layer of the top wall being connected to the base fabric layer of the bottom wall by the drop stitch structure and (ii) a fluid tight scrim layer lining the base layer, the scrim layer comprising two sheet layers having a scrim sheet in between.

5. The cushioning device of claim 1, wherein the gelatinous material is a super absorbent polymer.

6. The cushioning device of claim 1, wherein the mixture comprises about 1-20% v/v % gaseous compound and about 80-99% v/v % gelatinous material.

7. The cushioning device of claim 1, wherein the gaseous compound includes air, nitrogen, argon, or a combination thereof.

8. The cushioning device of claim 1, wherein the cushioning device further includes an intake valve, the intake valve being connected with the gas supply reservoir, the intake valve having an intake check valve configured for allowing the gas of the gas supply reservoir to flow into the cushioning device, while preventing the filling material from flowing out of the cushioning device.

9. The cushioning device of claim 1, wherein the cushioning device when filled with the filling material is capable of withstanding an animal weighing more than about 400 Kg.

10. A kit comprising:
    (a) a cushioning device according to claim 1 and (b) a compound capable of creating a gelatinous filling material when in contact with a liquid solution.

11. The kit of claim 10, wherein the compound capable of creating a gelatinous filling material is provided inside the chamber or outside the chamber.

12. The kit of claim 10, wherein the kit further comprises an installation manual.

* * * * *